United States Patent
Hsieh et al.

(10) Patent No.: US 10,536,091 B1
(45) Date of Patent: Jan. 14, 2020

(54) ENERGY HARVESTING DEVICE

(71) Applicant: National Tsing Hua University, Hsinchu (TW)

(72) Inventors: Ping-Hsuan Hsieh, Hsinchu (TW); Shih-Wei Wang, Tainan (TW); Yi-Wen Ke, Taichung (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 16/191,802

(22) Filed: Nov. 15, 2018

(51) Int. Cl.
*H02M 7/219* (2006.01)
*H02M 1/00* (2006.01)
*H02M 3/155* (2006.01)

(52) U.S. Cl.
CPC ............ *H02M 7/219* (2013.01); *H02M 3/155* (2013.01); *H02M 2001/007* (2013.01); *H02M 2007/2195* (2013.01)

(58) Field of Classification Search
CPC ........... H02M 2001/007; H02M 3/155; H02M 7/217; H02M 7/219; H02M 2007/2195
See application file for complete search history.

(56) References Cited

U.S. PATENT DOCUMENTS

| | | | |
|---|---|---|---|
| 6,049,473 A | 4/2000 | Jang et al. | |
| 2011/0141784 A1* | 6/2011 | Lee | H02M 7/217 363/127 |
| 2011/0227543 A1* | 9/2011 | Ivanov | H02M 7/219 320/163 |
| 2015/0042274 A1* | 2/2015 | Kim | H02J 7/06 320/108 |
| 2015/0326142 A1* | 11/2015 | Petras | H02J 50/80 307/104 |
| 2015/0326143 A1* | 11/2015 | Petras | H02M 7/217 363/127 |
| 2015/0364928 A1* | 12/2015 | Yen | H04B 5/0037 320/108 |
| 2016/0268834 A1* | 9/2016 | Satyamoorthy | H02J 7/025 |
| 2017/0155340 A1* | 6/2017 | Luan | H02M 7/219 |
| 2017/0338736 A1 | 11/2017 | Ofek | |
| 2018/0069433 A1* | 3/2018 | Lin | H02J 50/12 |
| 2018/0212523 A1* | 7/2018 | Leabman | H02M 7/217 |
| 2018/0376553 A1* | 12/2018 | Chen | H02M 3/156 |
| 2019/0081559 A1* | 3/2019 | Seshia | H02M 3/07 |

FOREIGN PATENT DOCUMENTS

TW 201128908 A1 8/2011

OTHER PUBLICATIONS

Taiwanese Search Report for Taiwanese Application No. 107144701, dated Jun. 11, 2019, with English translation.

* cited by examiner

*Primary Examiner* — Fred E Finch, III
(74) *Attorney, Agent, or Firm* — Birch, Stewart, Kolasch & Birch, LLP (57) ABSTRACT

An energy harvesting device includes: a rectifier circuit rectifying an AC supply voltage received between first and second input terminals thereof to generate a DC rectified voltage between first and second output terminals thereof; a converter circuit performing DC-to-DC conversion upon the DC rectified voltage based on a control signal to generate a DC output voltage; and a control circuit comparing a first to-be-compared voltage (correlated to the DC rectified voltage) and a second to-be-compared voltage (correlated to a difference voltage between one of the first and second input terminals of the rectifier circuit and one of the first and second output terminals of the rectifier circuit) to generate the control signal.

12 Claims, 6 Drawing Sheets

ENERGY HARVESTING DEVICE

FIELD

The disclosure relates to an energy harvesting device, and more particularly to an energy harvesting device that can enhance energy harvested thereby.

BACKGROUND

An energy harvesting device harvests energy from an energy source, and relays the harvested energy to a load. For the energy harvesting device, it is important to enhance the harvested energy.

SUMMARY

Therefore, an object of the disclosure is to provide an energy harvesting device that can enhance energy harvested thereby.

According to the disclosure, the energy harvesting device is for harvesting energy from an energy source that outputs an alternating current (AC) supply voltage. The energy harvesting device includes a rectifier circuit, a converter circuit and a control circuit. The rectifier circuit has a first input terminal and a second input terminal that are used to be coupled to the energy source for cooperatively receiving the AC supply voltage therefrom, a first output terminal and a second output terminal. The rectifier circuit rectifies the AC supply voltage to generate a direct current (DC) rectified voltage between the first and second output terminals thereof. The converter circuit is coupled to the first and second output terminals of the rectifier circuit for receiving the DC rectified voltage therefrom, is used to be coupled further to a load, and is for further receiving a control signal. The converter circuit performs DC-to-DC conversion upon the DC rectified voltage based on the control signal to generate a DC output voltage for receipt by the load. The control circuit is coupled to the rectifier circuit and the converter circuit, is for receiving the DC rectified voltage between the first and second output terminals of the rectifier circuit, and is for receiving a difference voltage between one of the first and second input terminals of the rectifier circuit and one of the first and second output terminals of the rectifier circuit. The control circuit generates a first to-be-compared voltage correlated to the DC rectified voltage, generates a second to-be-compared voltage correlated to the difference voltage, and compares the first and second to-be-compared voltages to generate the control signal for receipt by the converter circuit.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
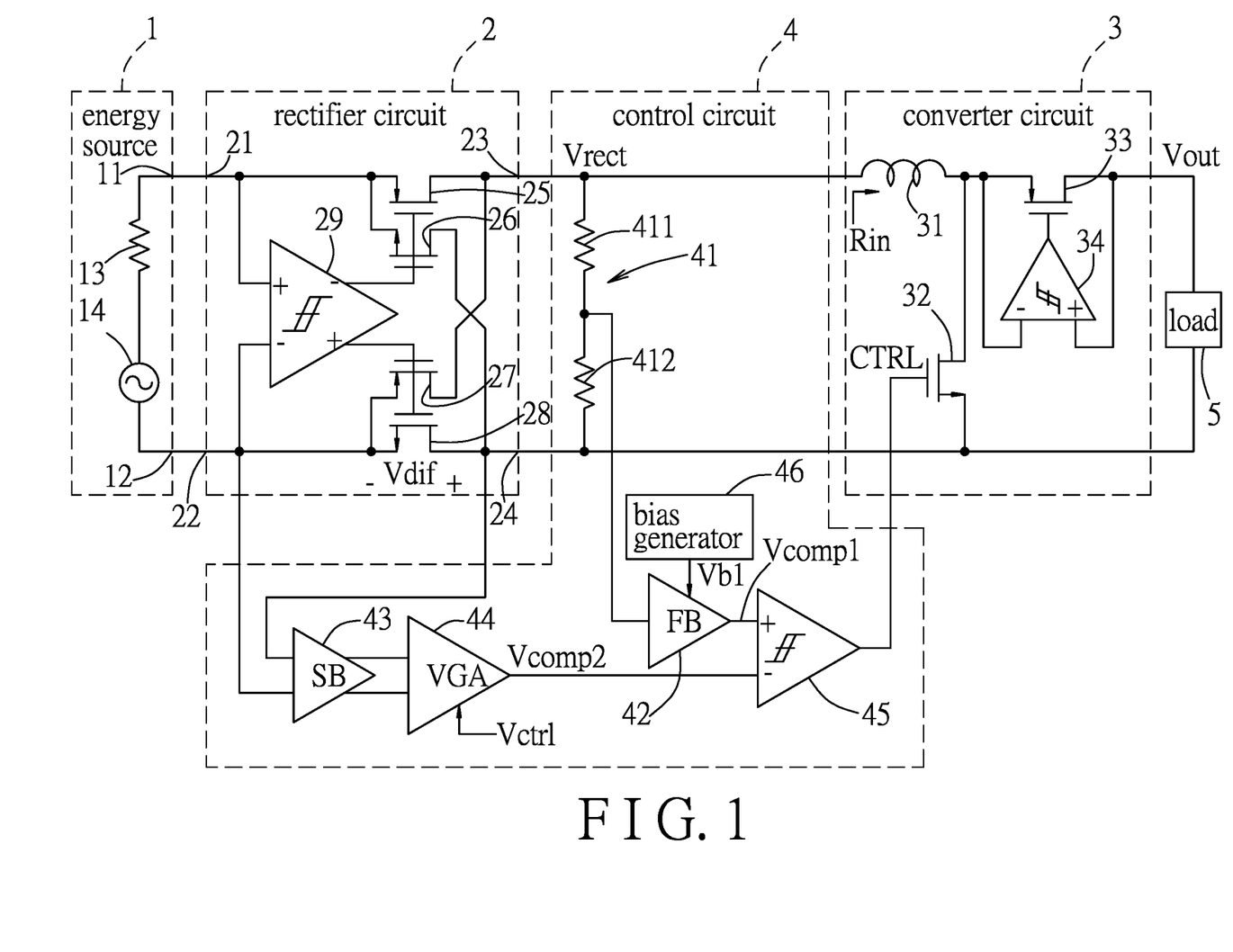
FIG. 1 is a circuit block diagram illustrating an embodiment of an energy harvesting device according to the disclosure.

Referring to FIG. 1, an embodiment of an energy harvesting device according to the disclosure is for harvesting energy from an energy source 1. The energy source 1 has a first output terminal 11 and a second output terminal 12, equivalently includes a resistor 13 and an alternating current (AC) supply 14 that are coupled in series between the first and second output terminals 11, 12 thereof (with the resistor 13 coupled to the first output terminal 11 and the AC supply 14 coupled to the second output terminal 12), and outputs an AC supply voltage between the first and second output terminals 11, 12 thereof. In an example, the energy source 1 is installed in a wearable equipment, and converts vibration due to motion of a person into electricity when the wearable equipment is worn by the person. The energy harvesting device of this embodiment includes a rectifier circuit 2, a converter circuit 3 and a control circuit 4.

The rectifier circuit 2 has a first input terminal 21 and a second input terminal 22 that are used to be coupled respectively to the first and second output terminals 11, 12 of the energy source 1 for cooperatively receiving the AC supply voltage therefrom, a first output terminal 23 and a second output terminal 24. The rectifier circuit 2 rectifies the AC supply voltage to generate a direct current (DC) rectified voltage (Vrect) between the first and second output terminals 23, 24 thereof.

In this embodiment, the rectifier circuit 2 includes four switches 25-28 and a comparator 29. The switch 25 (e.g., a P-channel metal oxide semiconductor field effect transistor (pMOSFET)) is coupled between the first input terminal 21 and the first output terminal 23 of the rectifier circuit 2. The switch 26 (e.g., an N-channel metal oxide semiconductor field effect transistor (nMOSFET)) is coupled between the first input terminal 21 and the second output terminal 24 of the rectifier circuit 2. The switch 27 (e.g., a pMOSFET) is coupled between the second input terminal 22 and the first output terminal 23 of the rectifier circuit 2. The switch 28 (e.g., an nMOSFET) is coupled between the second input terminal 22 and the second output terminal 24 of the rectifier circuit 2. The comparator 29 has a first input terminal (e.g., a non-inverting input terminal) that is coupled to the first input terminal 21 of the rectifier circuit 2, a second input terminal (e.g., an inverting input terminal) that is coupled to the second input terminal 22 of the rectifier circuit 2, a first output terminal (e.g., an inverting output terminal) that is coupled to the switches 25, 26, and a second output terminal (e.g., a non-inverting output terminal) that is coupled to the switches 27, 28. The comparator 29 causes the switches 25, 28 to conduct and the switches 26, 27 to not conduct when the AC supply voltage causes a potential at the first input terminal 21 of the rectifier circuit 2 to be higher than a potential at the second input terminal 22 of the rectifier circuit 2. In addition, the comparator 29 causes the switches 26, 27 to conduct and the switches 25, 28 to not conduct when the AC supply voltage causes the potential at the first input terminal 21 of the rectifier circuit 2 to be lower than the potential at the second input terminal 22 of the rectifier circuit 2.

The converter circuit 3 is coupled to the first and second output terminals 23, 24 of the rectifier circuit for receiving the DC rectified voltage (Vrect) therefrom, is used to be coupled further to a load 5, and is for further receiving a control signal (CTRL). The converter circuit 3 performs DC-to-DC conversion upon the DC rectified voltage (Vrect) based on the control signal (CTRL) to generate a DC output voltage (Vout) for receipt by the load 5.

In this embodiment, the converter circuit 3 uses a boost topology, and includes an inductor 31, two switches 32, 33 and a comparator 34. The inductor 31 has a first terminal that is coupled to the first output terminal 23 of the rectifier circuit 2, and a second terminal. The switch 32 (e.g., an nMOSFET) is coupled between the second terminal of the inductor 31 and the second output terminal 24 of the rectifier circuit 2, and has a control terminal (e.g., a gate terminal) that is for receiving the control signal (CTRL). The switch 33 (e.g., a pMOSFET) has a first terminal (e.g., a source terminal) that is coupled to the second terminal of the inductor 31, a second terminal (e.g., a drain terminal) that is used to be coupled to the load 5, and a control terminal (e.g., a gate terminal). The comparator 34 has a first input terminal (e.g., an inverting input terminal) that is coupled to the second terminal of the inductor 31, a second input terminal (e.g., a non-inverting input terminal) that is coupled to the second terminal of the switch 33, and an output terminal that is coupled to the control terminal of the switch 33. The DC rectified voltage (Vrect) is received across the inductor 31 and the switch 32. The DC output voltage (Vout) is provided across the switches 32, 33. The inductor 31 stores energy from the rectifier circuit 2 during a time period where the switch 32 conducts, and releases energy stored therein to the load 5 through the switch 33 during at least a portion of a time period where the switch 32 does not conduct. It should be noted that, the converter circuit 3 operates in a discontinuous conduction mode in this embodiment, but may operate in a continuous conduction mode in other embodiments.

The control circuit 4 is coupled to the second input terminal 22 and the first and second output terminals 23, 24 of the rectifier circuit 2 and to the control terminal of the switch 32, is for receiving the DC rectified voltage (Vrect) between the first and second output terminals 23, 24 of the rectifier circuit 2, and is for receiving a difference voltage (Vdif) between the second output terminal 24 and the second input terminal 22 of the rectifier circuit 2. The control circuit 4 generates a first to-be-compared voltage (Vcomp1) correlated to the DC rectified voltage (Vrect), generates a second to-be-compared voltage (Vcomp2) correlated to the difference voltage (Vdif), and compares the first and second to-be-compared voltages (Vcomp1, Vcomp2) to generate the control signal (CTRL) for receipt by the control terminal of the switch 32.

In this embodiment, the control signal (CTRL) is generated in such a way that the switch 32 conducts when the first to-be-compared voltage (Vcomp1) is higher than the second to-be-compared voltage (Vcomp2), and that the switch 32 does not conduct when the first to-be-compared voltage (Vcomp1) is lower than the second to-be-compared voltage (Vcomp2).

In this embodiment, the control circuit 4 includes a voltage divider 41, a first buffer (FB) 42, a second buffer (SB) 43, a variable gain amplifier (VGA) 44, a comparator 45 and a bias generator 46. The voltage divider 41 is coupled to the first and second output terminals 23, 24 of the rectifier circuit 2 for receiving the DC rectified voltage (Vrect) therefrom, and divides the DC rectified voltage (Vrect) to generate a divided voltage. The first buffer 42 is coupled to the voltage divider 41 for receiving the divided voltage therefrom, and buffers the divided voltage to generate the first to-be-compared voltage (Vcomp1). The second buffer 43 is coupled to the second output terminal 24 and the second input terminal 22 of the rectifier circuit 2 for receiving the difference voltage (Vdif) therefrom, and buffers the difference voltage (Vdif) to generate a buffered voltage. The variable gain amplifier 44 is coupled to the second buffer 43 for receiving the buffered voltage therefrom, is for further receiving a control voltage (Vctrl), and amplifies the buffered voltage by a gain variable according to the control voltage (Vctrl) to generate the second to-be-compared voltage (Vcomp2). The comparator 45 has a first input terminal (e.g., a non-inverting input terminal) that is coupled to the first buffer 42 for receiving the first to-be-compared voltage (Vcomp1) therefrom, a second input terminal (e.g., an inverting input terminal) that is coupled to the variable gain amplifier 44 for receiving the second to-be-compared voltage (Vcomp2) therefrom, and an output terminal that is coupled to the control terminal of the switch 32. The comparator 45 compares the first and second to-be-compared voltages (Vcomp1, Vcomp2) to generate the control signal (CTRL) at the output terminal thereof for receipt by the control terminal of the switch 32. The bias generator 46 is coupled to the first buffer 42, and generates a bias voltage (Vb1) for biasing the first buffer 42 such that the first to-be-compared voltage (Vcomp1) has a DC component substantially equal to that of the second to-be-compared voltage (Vcomp2).

In this embodiment, the voltage divider 41 includes two resistors 411, 412 coupled in series between the first and second output terminals 23, 24 of the rectifier circuit 2. The divided voltage is provided at a common node of the resistors 411, 412.

Figure 2:
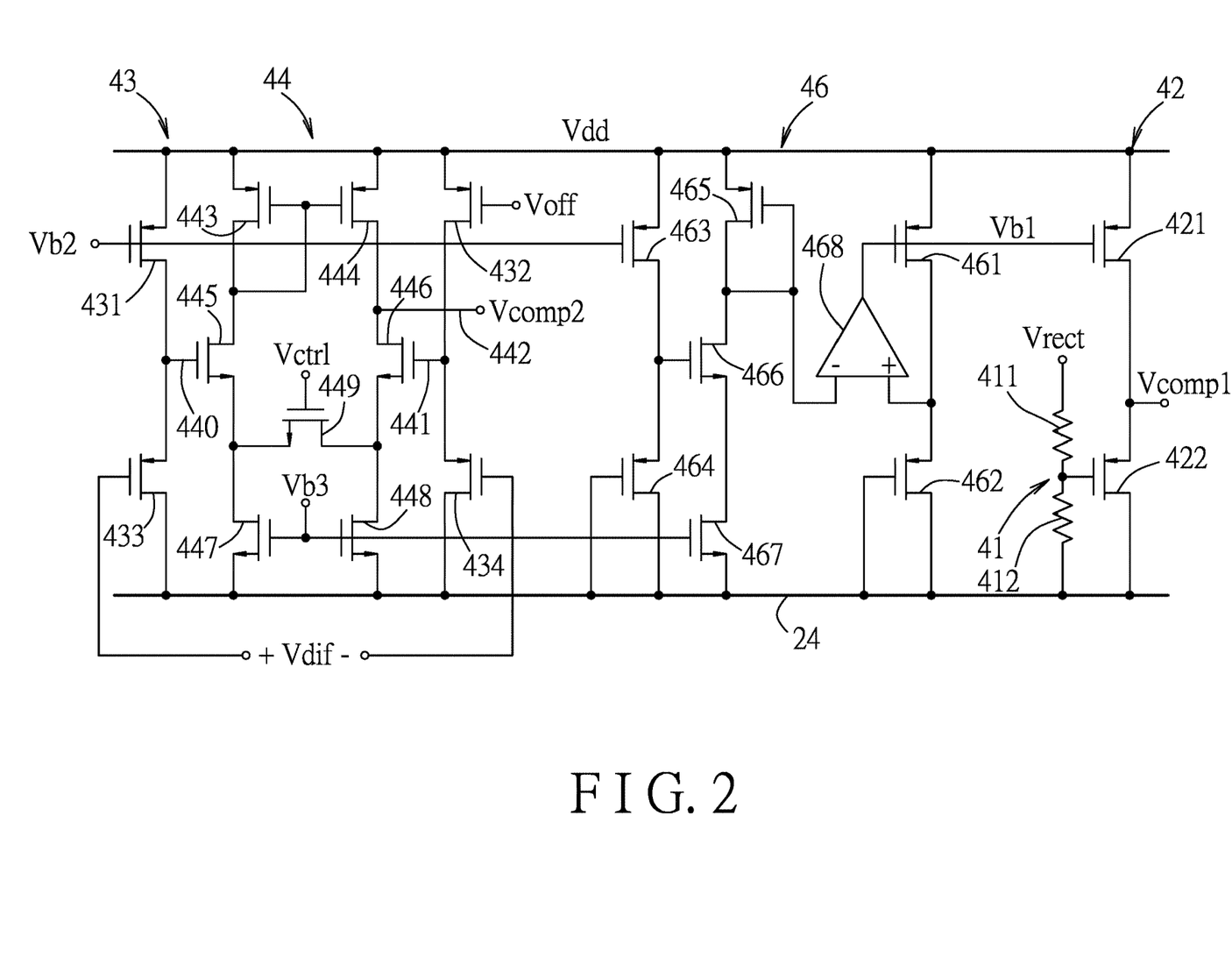
FIG. 2 is a circuit diagram illustrating a first buffer, a second buffer, a variable gain amplifier and a bias generator of the embodiment.

Referring to FIGS. 1 and 2, in this embodiment, the first buffer 42 includes two transistors 421, 422. The transistor 421 (e.g., a pMOSFET) has a first terminal (e.g., a source terminal) that is for receiving a supply voltage (Vdd), a second terminal (e.g., a drain terminal) that is coupled to the comparator 45, and a control terminal (e.g., a gate terminal) that is for receiving the bias voltage (Vb1). The transistor 422 (e.g., a pMOSFET) is coupled between the second terminal of the transistor 421 and the second output terminal 24 of the rectifier circuit 2, and has a control terminal (e.g., a gate terminal) that is coupled to the common node of the resistors 411, 412 for receiving the divided voltage therefrom. The first to-be-compared voltage (Vcomp1) is provided at the second terminal of the transistor 421.

In this embodiment, the second buffer 43 includes four transistors 431-434. The transistor 431 (e.g., a pMOSFET) has a first terminal (e.g., a source terminal) that is for receiving the supply voltage (Vdd), a second terminal (e.g., a drain terminal), and a control terminal (e.g., a gate terminal) that is for receiving a bias voltage (Vb2). The transistor 432 (e.g., a pMOSFET) has a first terminal (e.g., a source terminal) that is for receiving the supply voltage (Vdd), a second terminal (e.g., a drain terminal), and a control terminal (e.g., a gate terminal) that is for receiving an offset calibration voltage (Voff). The transistor 433 (e.g., a pMOSFET) is coupled between the second terminal of the transistor 431 and the second output terminal 24 of the rectifier circuit 2, and has a control terminal (e.g., a gate terminal) that is coupled to the second output terminal 24 of the rectifier circuit 2. The transistor 434 (e.g., a pMOSFET) is coupled between the second terminal of the transistor 432 and the second output terminal 24 of the rectifier circuit 2, and has a control terminal (e.g., a gate terminal) that is coupled to the second input terminal 22 of the rectifier circuit 2 and that cooperates with the control terminal of the transistor 433 to receive the difference voltage (Vdif). The buffered voltage is provided between the second terminals of the transistors 431, 432.

In this embodiment, the variable gain amplifier 44 has a non-inverting input terminal 440 that is coupled to the second terminal of the transistor 431, an inverting input terminal 441 that is coupled to the second terminal of the transistor 432 and that cooperates with the non-inverting input terminal 440 thereof to receive the buffered voltage, and an output terminal 442 that is coupled to the comparator 45 and that provides the second to-be-compared voltage (Vcomp2). In addition, the variable gain amplifier 44 includes seven transistors 443-449. The transistor 443 (e.g., a pMOSFET) has a first terminal (e.g., a source terminal) that is for receiving the supply voltage (Vdd), a second terminal (e.g., a drain terminal), and a control terminal (e.g., a gate terminal) that is coupled to the second terminal thereof. The transistor 444 (e.g., a pMOSFET) has a first terminal (e.g., a source terminal) that is for receiving the supply voltage (Vdd), a second terminal (e.g., a drain terminal) that is coupled to the output terminal 442 of the variable gain amplifier 44, and a control terminal (e.g., a gate terminal) that is coupled to the second terminal of the transistor 443. The transistor 445 (e.g., an nMOSFET) has a first terminal (e.g., a drain terminal) that is coupled to the second terminal of the transistor 443, a second terminal (e.g., a source terminal), and a control terminal (e.g., a gate terminal) that is coupled to the non-inverting input terminal 440 of the variable gain amplifier 44. The transistor 446 (e.g., an nMOSFET) has a first terminal (e.g., a drain terminal) that is coupled to the second terminal of the transistor 444, a second terminal (e.g., a source terminal), and a control terminal (e.g., a gate terminal) that is coupled to the inverting input terminal 441 of the variable gain amplifier 44. The transistor 447 (e.g., an nMOSFET) is coupled between the second terminal of the transistor 445 and the second output terminal 24 of the rectifier circuit 2, and has a control terminal (e.g., a gate terminal) that is for receiving a bias voltage (Vb3). The transistor 448 (e.g., an nMOSFET) is coupled between the second terminal of the transistor 446 and the second output terminal 24 of the rectifier circuit 2, and has a control terminal (e.g., a gate terminal) that is for receiving the bias voltage (Vb3). The transistor 449 (e.g., an nMOSFET) is coupled between the second terminals of the transistors 445, 446, and has a control terminal (e.g., a gate terminal) that is for receiving the control voltage (Vctrl).

In this embodiment, the bias generator 46 includes seven transistors 461-467 and an amplifier 468. The transistor 461 (e.g., a pMOSFET) has a first terminal (e.g., a source terminal) that is for receiving the supply voltage (Vdd), a second terminal (e.g., a drain terminal), and a control terminal (e.g., a gate terminal). The transistor 462 (e.g., a pMOSFET) is coupled between the second terminal of the transistor 461 and the second output terminal 24 of the rectifier circuit 2, and has a control terminal (e.g., a gate terminal) that is coupled to the second output terminal 24 of the rectifier circuit 2. The transistor 463 (e.g., a pMOSFET) has a first terminal (e.g., a source terminal) that is for receiving the supply voltage (Vdd), a second terminal (e.g., a drain terminal), and a control terminal (e.g., a gate terminal) that is for receiving the bias voltage (Vb2). The transistor 464 (e.g., a pMOSFET) is coupled between the second terminal of the transistor 463 and the second output terminal 24 of the rectifier circuit 2, and has a control terminal (e.g., a gate terminal) that is coupled to the second output terminal 24 of the rectifier circuit 2. The transistor 465 (e.g., a pMOSFET) has a first terminal (e.g., a source terminal) that is for receiving the supply voltage (Vdd), a second terminal (e.g., a drain terminal), and a control terminal (e.g., a gate terminal) that is coupled to the second terminal thereof. The transistor 466 (e.g., an nMOSFET) has a first terminal (e.g., a drain terminal) that is coupled to the second terminal of the transistor 465, a second terminal (e.g., a source terminal), and a control terminal (e.g., a gate terminal) that is coupled to the second terminal of the transistor 463. The transistor 467 (e.g., an nMOSFET) is coupled between the second terminal of the transistor 466 and the second output terminal 24 of the rectifier circuit 2, and has a control terminal (e.g., a gate terminal) that is for receiving the bias voltage (Vb3). The amplifier 468 has a non-inverting input terminal that is coupled to the second terminal of the transistor 461, an inverting input terminal that is coupled to the second terminal of the transistor 465, and an output terminal that is coupled to the control terminal of the transistor 461 and the control terminal of the transistor 421 and that provides the bias voltage (Vb1).

By properly setting the offset calibration voltage (Voff), various offsets of the control circuit 4 caused by mismatches due to practical layout and process variations can be compensated.

Under the control of the control circuit 4, an input resistance (Rin) of the converter circuit 3 is stabilized at A×Ron, where "A" is a product of the gain of the variable gain amplifier 44 and a reciprocal of a division ratio of the voltage divider 41, and "Ron" denotes an ON resistance of the switch 28. Therefore, the rectifier circuit 2 equivalently sees a constant-resistance load. By properly setting the control voltage (Vctrl), impedance matching at the output side of the rectifier circuit 2 can be improved, thereby enhancing output power of the rectifier circuit 2 and thus energy harvested by the energy harvesting device of this embodiment from the energy source 1.

Figure 3:
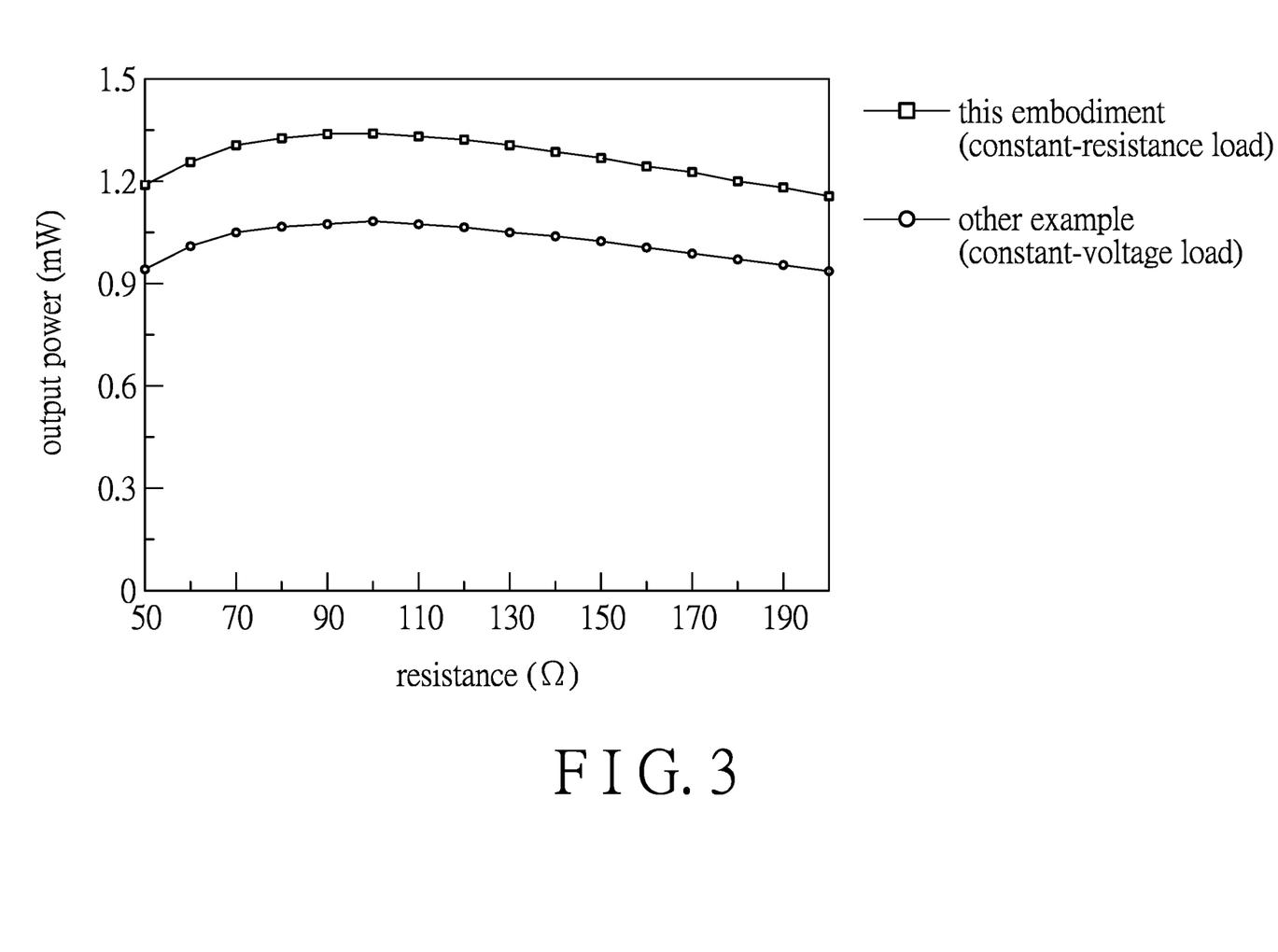
FIG. 3 is a plot illustrating output power versus resistance characteristic for the embodiment and one other example.

FIG. 3 illustrates simulated output power of the rectifier circuit 2 (see FIG. 2) of this embodiment and simulated output power of the rectifier circuit of one other example under a circumstance where the resistor 13 has a resistance of 90Ω. The rectifier circuit of the other example equivalently sees a constant-voltage load (e.g., the rectifier circuit further includes a capacitor that is coupled between the first and second output terminals thereof and that has a large capacitance to stabilize the DC rectified voltage). It is known from FIG. 3 that: (a) each output power reaches its peak value when the load equivalently seen by the corresponding rectifier circuit has a resistance of 90Ω; (b) there is a 20% improvement in the output power of the rectifier circuit 2 of this embodiment as compared to that of the other example.

Figure 4:
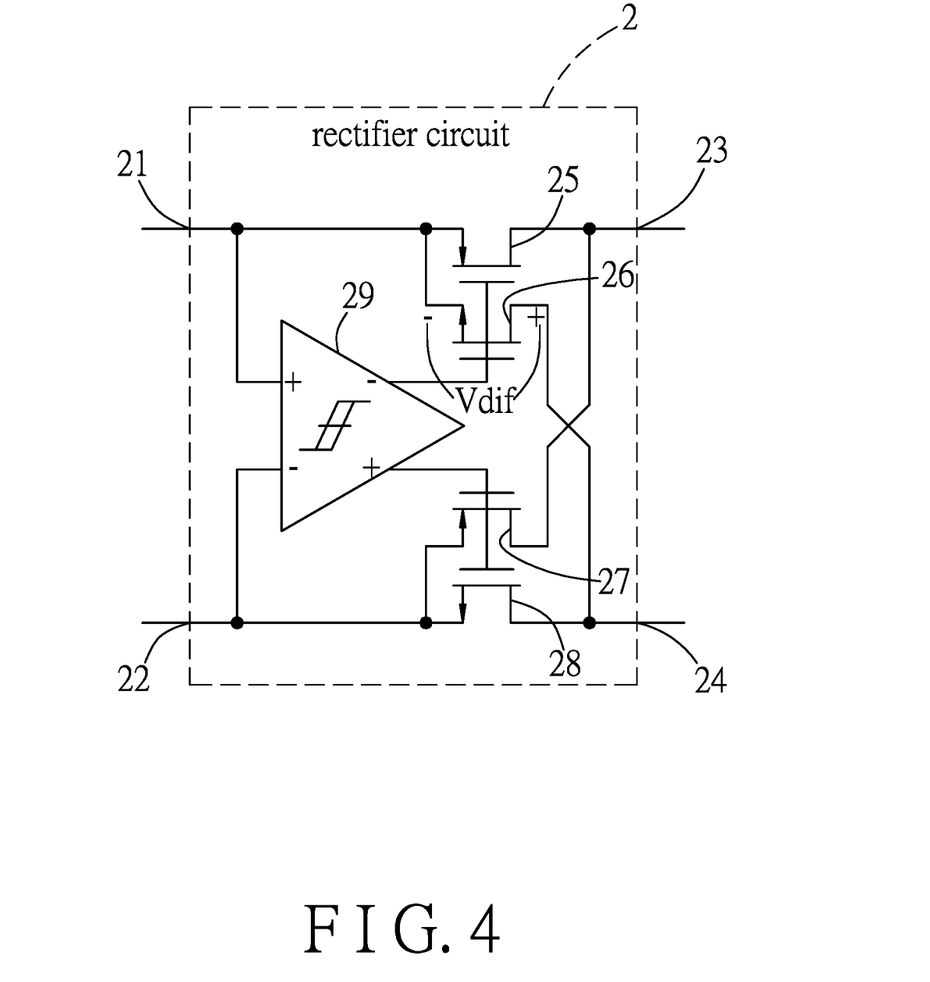
FIGS. 4 to 6 are circuit diagrams illustrating various modifications of the embodiment.

It should be noted that, in other embodiments, the following modifications may be made to this embodiment:

1. Referring to FIGS. 2 and 4, the control terminal of the transistor 434 of the second buffer 43 of the control circuit 4 is coupled to the first input terminal 21 of the rectifier circuit 2, instead of the second input terminal 22 of the rectifier circuit 2; and the control terminals of the transistors 433, 434 of the second buffer 43 of the control circuit 4 cooperatively receive the difference voltage (Vdif) between the second output terminal 24 and the first input terminal 21 of the rectifier circuit 2.

Figure 5:
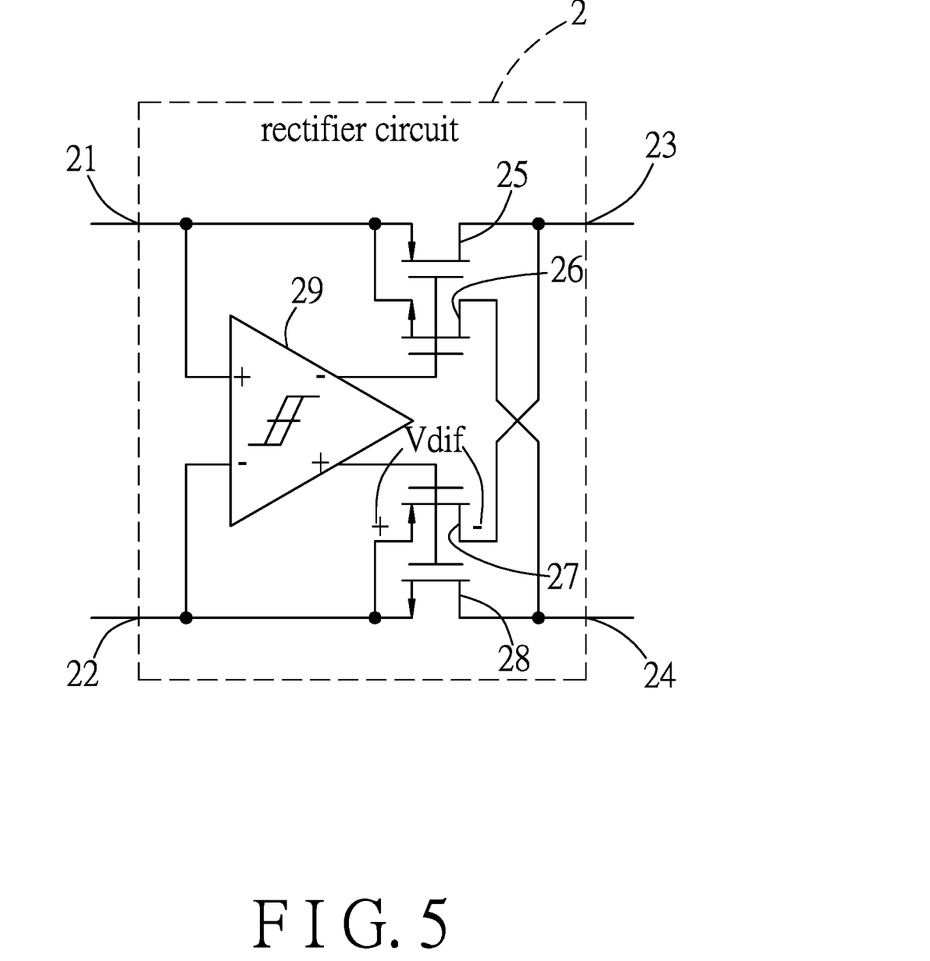

2. Referring to FIGS. 2 and 5, the control terminal of the transistor 433 of the second buffer 43 of the control circuit 4 is coupled to the second input terminal 22 of the rectifier circuit 2, instead of the second output terminal 24 of the rectifier circuit 2; the control terminal of the transistor 434 of the second buffer 43 of the control circuit 4 is coupled to the first output terminal 23 of the rectifier circuit 2, instead of the second input terminal 22 of the rectifier circuit 2; and the control terminals of the transistors 433, 434 of the second buffer 43 of the control circuit 4 cooperatively receive the difference voltage (Vdif) between the second input terminal 22 and the first output terminal 23 of the rectifier circuit 2.

Figure 6:
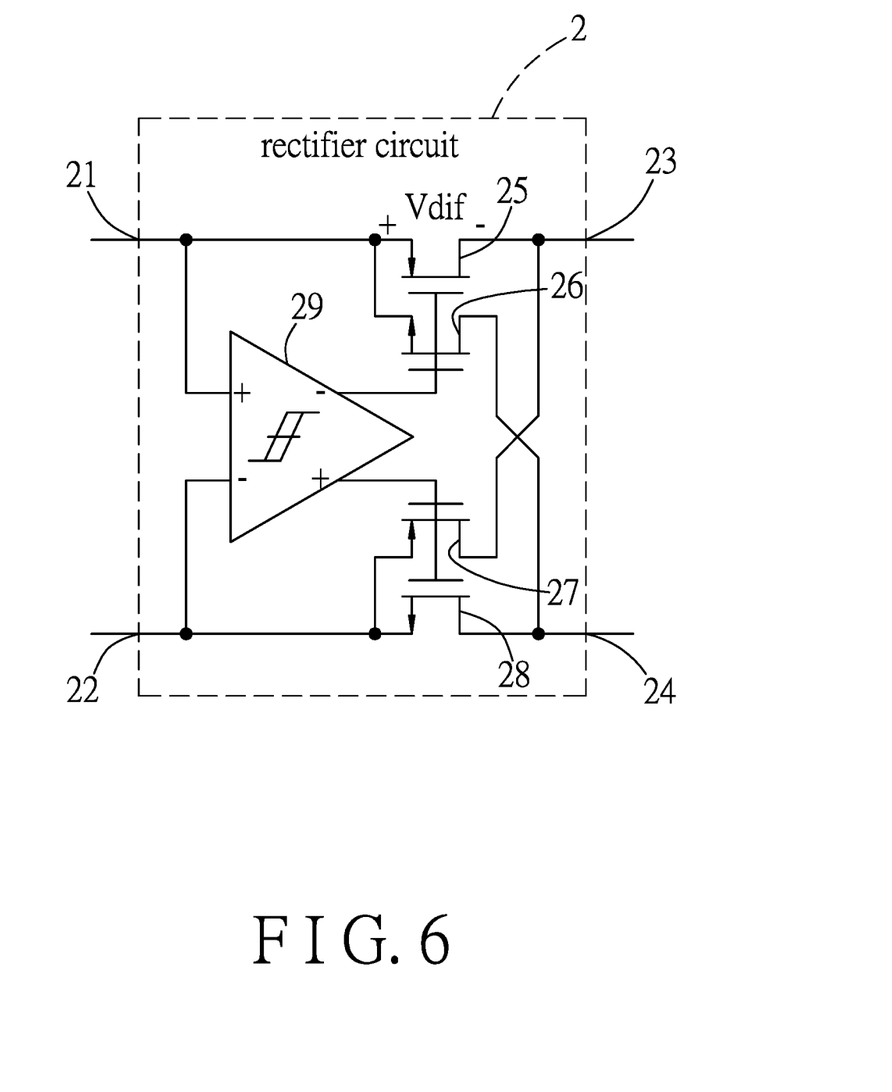

3. Referring to FIGS. 2 and 6, the control terminal of the transistor 433 of the second buffer 43 of the control circuit 4 is coupled to the first input terminal 21 of the rectifier circuit 2, instead of the second output terminal 24 of the rectifier circuit 2; the control terminal of the transistor 434 of the second buffer 43 of the control circuit 4 is coupled to the first output terminal 23 of the rectifier circuit 2, instead of the second input terminal 22 of the rectifier circuit 2; and the control terminals of the transistors 433, 434 of the second buffer 43 of the control circuit 4 cooperatively receive the difference voltage (Vdif) between the first input terminal 21 and the first output terminal 23 of the rectifier circuit 2.

4. Referring back to FIG. 1, in the rectifier circuit 2, the switches 25-28 are respectively replaced by four diodes, and the comparator 29 is omitted. In this case, a first one of the diodes has an anode that is coupled to the first input terminal 21 of the rectifier circuit 2, and a cathode that is coupled to the first output terminal 23 of the rectifier circuit 2; a second one of the diodes has an anode that is coupled to the second output terminal 24 of the rectifier circuit 2, and a cathode that is coupled to the first input terminal 21 of the rectifier circuit 2; a third one of the diodes has an anode that is coupled to the second input terminal 22 of the rectifier circuit 2, and a cathode that is coupled to the first output terminal 23 of the rectifier circuit 2; and a fourth one of the diodes has an anode that is coupled to the second output terminal 24 of the rectifier circuit 2, and a cathode that is coupled to the second input terminal 22 of the rectifier circuit 2.

5. In the converter circuit 3, the switch 33 is replaced by a diode, and the comparator 34 is omitted. In this case, the diode has an anode that is coupled to the second terminal of the inductor 31, and a cathode that is used to be coupled to the load 5.

6. The converter circuit 3 uses a buck topology or a buck-boost topology, instead of the boost topology.

7. The bias generator 46 of the control circuit 4 is omitted.

8. Referring to FIG. 2, the control terminal of the transistor 432 of the second buffer 43 of the control circuit 4 is for receiving the bias voltage (Vb2), instead of the offset calibration voltage (Voff).

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been de scribed in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. An energy harvesting device for harvesting energy from an energy source that outputs an alternating current (AC) supply voltage, said energy harvesting device comprising:
    a rectifier circuit having a first input terminal and a second input terminal that are used to be coupled to the energy source for cooperatively receiving the AC supply voltage therefrom, a first output terminal and a second output terminal, said rectifier circuit rectifying the AC supply voltage to generate a direct current (DC) rectified voltage between said first and second output terminals thereof;
    a converter circuit coupled to said first and second output terminals of said rectifier circuit for receiving the DC rectified voltage therefrom, used to be coupled further to a load, and for further receiving a control signal, said converter circuit performing DC-to-DC conversion upon the DC rectified voltage based on the control signal to generate a DC output voltage for receipt by the load; and
    a control circuit coupled to said rectifier circuit and said converter circuit, for receiving the DC rectified voltage between said first and second output terminals of said rectifier circuit, and for receiving a difference voltage between one of said first and second input terminals of said rectifier circuit and one of said first and second output terminals of said rectifier circuit;
    said control circuit generating a first to-be-compared voltage correlated to the DC rectified voltage, generating a second to-be-compared voltage correlated to the difference voltage, and comparing the first and second to-be-compared voltages to generate the control signal for receipt by said converter circuit;
    said control circuit generating the control signal in such a way that said converter circuit stores energy from said rectifier circuit during a time period where the first to-be-compared voltage is higher than the second to-be-compared voltage, and that said converter circuit releases energy stored therein to the load during at least a portion of a time period where the first to-be-compared voltage is lower than the second to-be-compared voltage.

2. The energy harvesting device of claim 1, wherein said control circuit includes:
    a voltage divider coupled to said first and second output terminals of said rectifier circuit for receiving the DC rectified voltage therefrom, and dividing the DC rectified voltage to generate a divided voltage;
    a first buffer coupled to said voltage divider for receiving the divided voltage therefrom, and buffering the divided voltage to generate the first to-be-compared voltage;
    a second buffer coupled to said one of said first and second input terminals of said rectifier circuit and said one of said first and second output terminals of said rectifier circuit for receiving the difference voltage therefrom, and buffering the difference voltage to generate a buffered voltage;
    a variable gain amplifier coupled to said second buffer for receiving the buffered voltage therefrom, for further receiving a control voltage, and amplifying the buffered voltage by a gain variable according to the control voltage to generate the second to-be-compared voltage; and a comparator coupled to said first buffer and said variable gain amplifier for receiving the first and second to-be-compared voltages respectively therefrom, coupled further to said converter circuit, and comparing the first and second to-be-compared voltages to generate the control signal for receipt by said converter circuit.

3. The energy harvesting device of claim 2, wherein said control circuit further includes a bias generator that is coupled to said first buffer, and that generates a bias voltage for biasing said first buffer such that the first to-be-compared voltage has a DC component substantially equal to that of the second to-be-compared voltage.

4. The energy harvesting device of claim 2, wherein said first buffer includes:
a first transistor having a first terminal that is for receiving a supply voltage, a second terminal that is coupled to said comparator, and a control terminal that is for receiving a first bias voltage; and
a second transistor coupled between said second terminal of said first transistor and said second output terminal of said rectifier circuit, and having a control terminal that is coupled to said voltage divider for receiving the divided voltage therefrom;
the first to-be-compared voltage being provided at said second terminal of said first transistor.

5. The energy harvesting device of claim 4, wherein said second buffer includes:
a third transistor having a first terminal that is for receiving the supply voltage, a second terminal, and a control terminal that is for receiving a second bias voltage;
a fourth transistor having a first terminal that is for receiving the supply voltage, and a second terminal;
a fifth transistor coupled between said second terminal of said third transistor and said second output terminal of said rectifier circuit; and
a sixth transistor coupled between said second terminal of said fourth transistor and said second output terminal of said rectifier circuit;
the buffered voltage being provided between said second terminals of said third and fourth transistors.

6. The energy harvesting device of claim 5, wherein said fourth transistor further has a control terminal for receiving an offset calibration voltage.

7. The energy harvesting device of claim 6, wherein said variable gain amplifier has a non-inverting input terminal that is coupled to said second terminal of said third transistor, an inverting input terminal that is coupled to said second terminal of said fourth transistor and that cooperates with said non-inverting input terminal thereof to receive the buffered voltage, and an output terminal that is coupled to said comparator and that provides the second to-be-compared voltage.

8. The energy harvesting device of claim 7, wherein:
said fifth transistor has a control terminal coupled to said second output terminal of said rectifier circuit;
said sixth transistor has a control terminal coupled to said one of said first and second input terminals of said rectifier circuit;
said control terminals of said fifth and sixth transistors cooperatively receive the difference voltage between said second output terminal of said rectifier circuit and said one of said first and second input terminals of said rectifier circuit.

9. The energy harvesting device of claim 7, wherein:
said fifth transistor has a control terminal coupled to said one of said first and second input terminals of said rectifier circuit;
said sixth transistor has a control terminal coupled to said first output terminal of said rectifier circuit;
said control terminals of said fifth and sixth transistors cooperatively receive the difference voltage between said one of said first and second input terminals of said rectifier circuit and said first output terminal of said rectifier circuit.

10. The energy harvesting device of claim 7, wherein said variable gain amplifier includes:
a seventh transistor having a first terminal that is for receiving the supply voltage, a second terminal, and a control terminal that is coupled to said second terminal thereof;
an eighth transistor having a first terminal that is for receiving the supply voltage, a second terminal that is coupled to said output terminal of said variable gain amplifier, and a control terminal that is coupled to said second terminal of said seventh transistor;
a ninth transistor having a first terminal that is coupled to said second terminal of said seventh transistor, a second terminal, and a control terminal that is coupled to said non-inverting input terminal of said variable gain amplifier;
a tenth transistor having a first terminal that is coupled to said second terminal of said eighth transistor, a second terminal, and a control terminal that is coupled to said inverting input terminal of said variable gain amplifier;
an eleventh transistor coupled between said second terminal of said ninth transistor and said second output terminal of said rectifier circuit, and having a control terminal that is for receiving a third bias voltage;
a twelfth transistor coupled between said second terminal of said tenth transistor and said second output terminal of said rectifier circuit, and having a control terminal that is for receiving the third bias voltage; and
a thirteenth transistor coupled between said second terminals of said ninth and tenth transistors, and having a control terminal that is for receiving the control voltage.

11. The energy harvesting device of claim 10, wherein said control circuit further includes a bias generator including:
a fourteenth transistor having a first terminal that is for receiving the supply voltage, a second terminal, and a control terminal;
a fifteenth transistor coupled between said second terminal of said fourteenth transistor and said second output terminal of said rectifier circuit, and having a control terminal that is coupled to said second output terminal of said rectifier circuit;
a sixteenth transistor having a first terminal that is for receiving the supply voltage, a second terminal, and a control terminal that is for receiving the second bias voltage;
a seventeenth transistor coupled between said second terminal of said sixteenth transistor and said second output terminal of said rectifier circuit, and having a control terminal that is coupled to said second output terminal of said rectifier circuit;
an eighteenth transistor having a first terminal that is for receiving the supply voltage, a second terminal, and a control terminal that is coupled to said second terminal thereof;

a nineteenth transistor having a first terminal that is coupled to said second terminal of said eighteenth transistor, a second terminal, and a control terminal that is coupled to said second terminal of said sixteenth transistor;

a twentieth transistor coupled between said second terminal of said nineteenth transistor and said second output terminal of said rectifier circuit, and having a control terminal that is for receiving the third bias voltage; and an amplifier having a non-inverting input terminal that is coupled to said second terminal of said fourteenth transistor, an inverting input terminal that is coupled to said second terminal of said eighteenth transistor, and an output terminal that is coupled to said control terminal of said fourteenth transistor and said control terminal of said first transistor and that provides the first bias voltage.

12. An energy harvesting device for harvesting energy from an energy source that outputs an alternating current (AC) supply voltage, said energy harvesting device comprising:

a rectifier circuit having a first input terminal and a second input terminal that are used to be coupled to the energy source for cooperatively receiving the AC supply voltage therefrom, a first output terminal and a second output terminal, said rectifier circuit rectifying the AC supply voltage to generate a direct current (DC) rectified voltage between said first and second output terminals thereof;

a converter circuit coupled to said first and second output terminals of said rectifier circuit for receiving the DC rectified voltage therefrom, used to be coupled further to a load, and for further receiving a control signal, said converter circuit performing DC-to-DC conversion upon the DC rectified voltage based on the control signal to generate a DC output voltage for receipt by the load; and a control circuit coupled to said rectifier circuit and said converter circuit, for receiving the DC rectified voltage between said first and second output terminals of said rectifier circuit, and for receiving a difference voltage between one of said first and second input terminals of said rectifier circuit and one of said first and second output terminals of said rectifier circuit;

said control circuit generating a first to-be-compared voltage correlated to the DC rectified voltage, generating a second to-be-compared voltage correlated to the difference voltage, and comparing the first and second to-be-compared voltages to generate the control signal for receipt by said converter circuit;

said control circuit including:

a voltage divider coupled to said first and second output terminals of said rectifier circuit for receiving the DC rectified voltage therefrom, and dividing the DC rectified voltage to generate a divided voltage, a first buffer coupled to said voltage divider for receiving the divided voltage therefrom, and buffering the divided voltage to generate the first to-be-compared voltage, a second buffer coupled to said one of said first and second input terminals of said rectifier circuit and said one of said first and second output terminals of said rectifier circuit for receiving the difference voltage therefrom, and buffering the difference voltage to generate a buffered voltage, a variable gain amplifier coupled to said second buffer for receiving the buffered voltage therefrom, for further receiving a control voltage, and amplifying the buffered voltage by a gain variable according to the control voltage to generate the second to-be-compared voltage, and a comparator coupled to said first buffer and said variable gain amplifier for receiving the first and second to-be-compared voltages respectively therefrom, coupled further to said converter circuit, and comparing the first and second to-be-compared voltages to generate the control signal for receipt by said converter circuit.

* * * * *